UNITED STATES PATENT OFFICE.

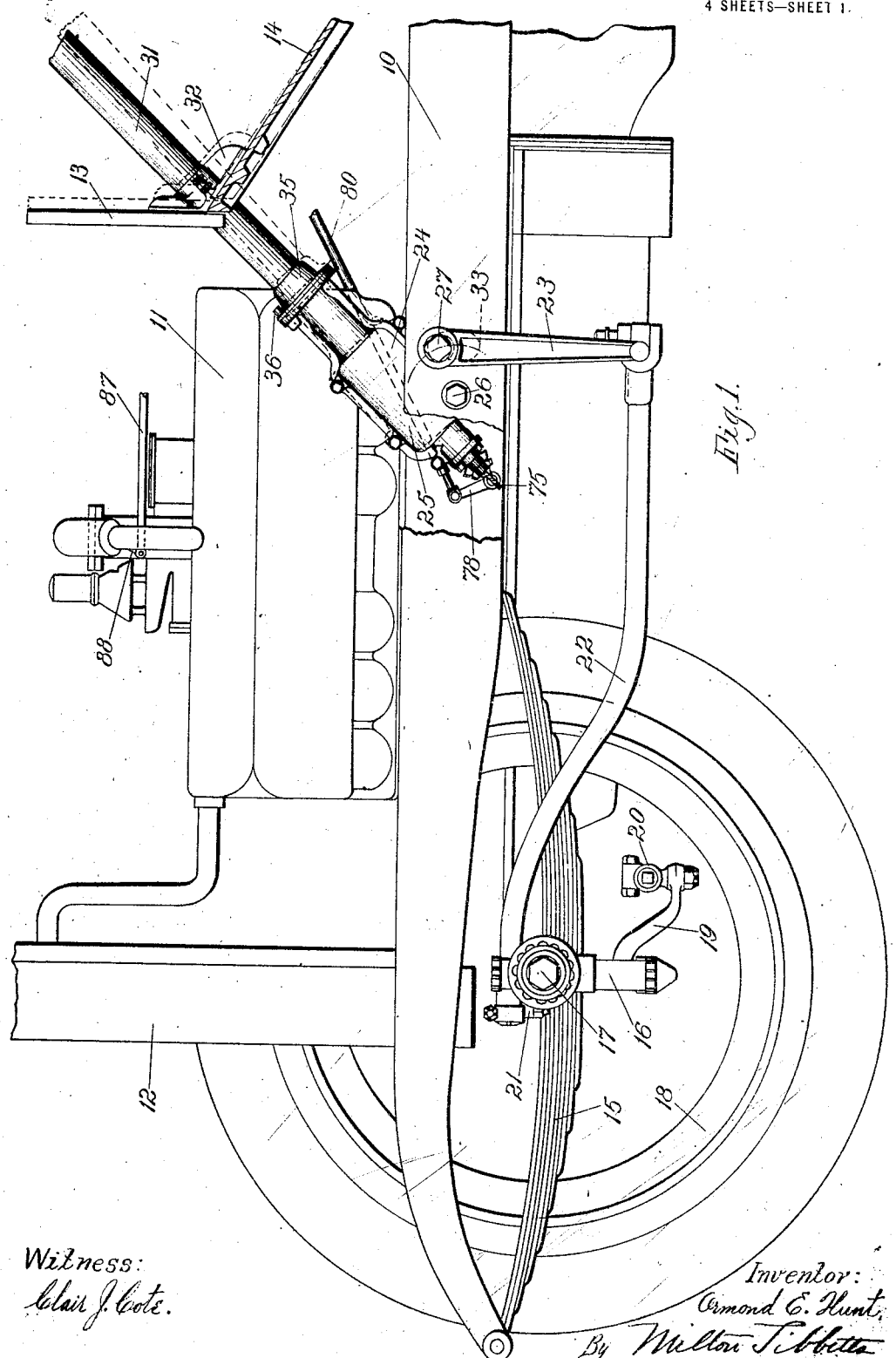

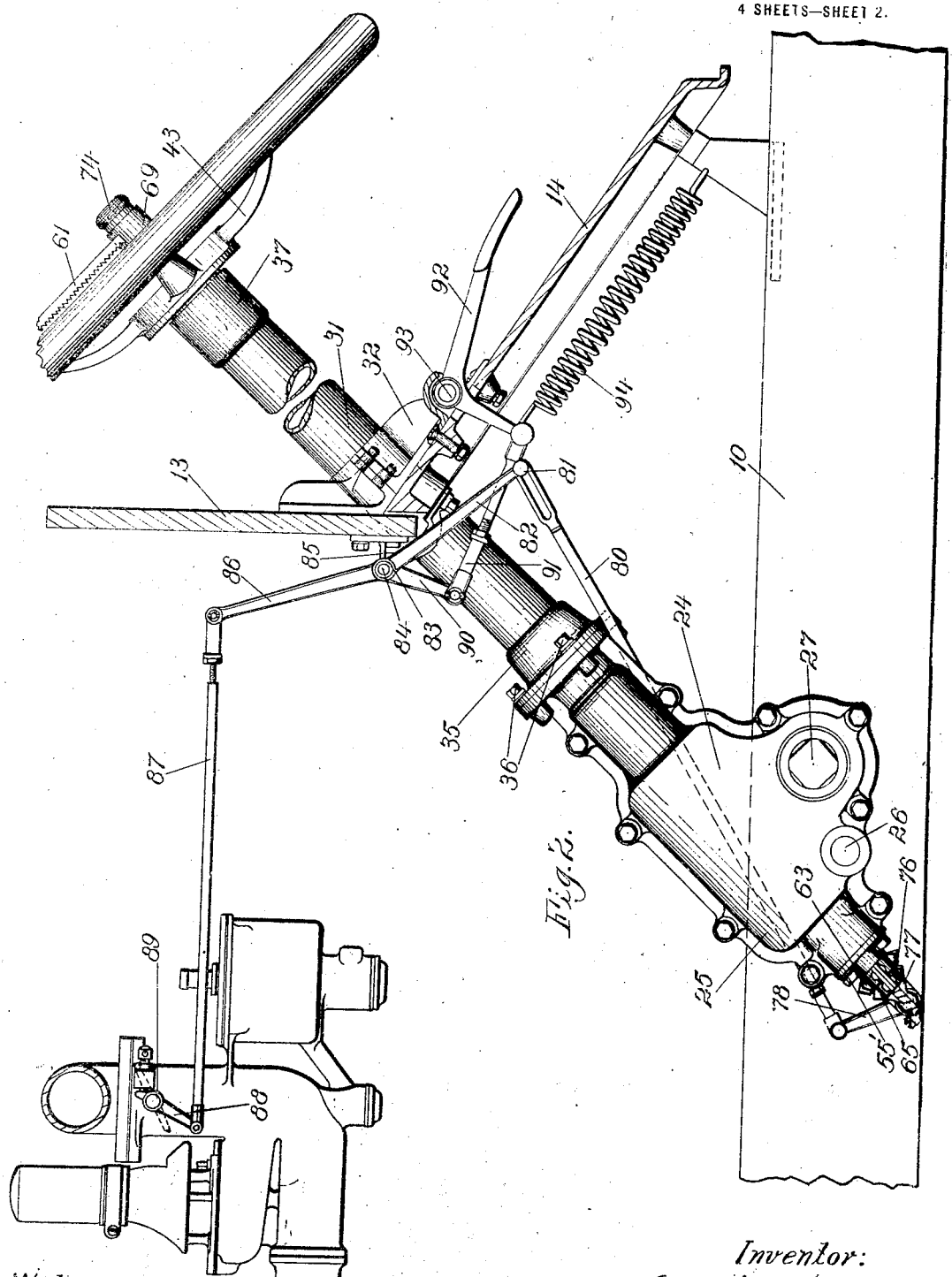

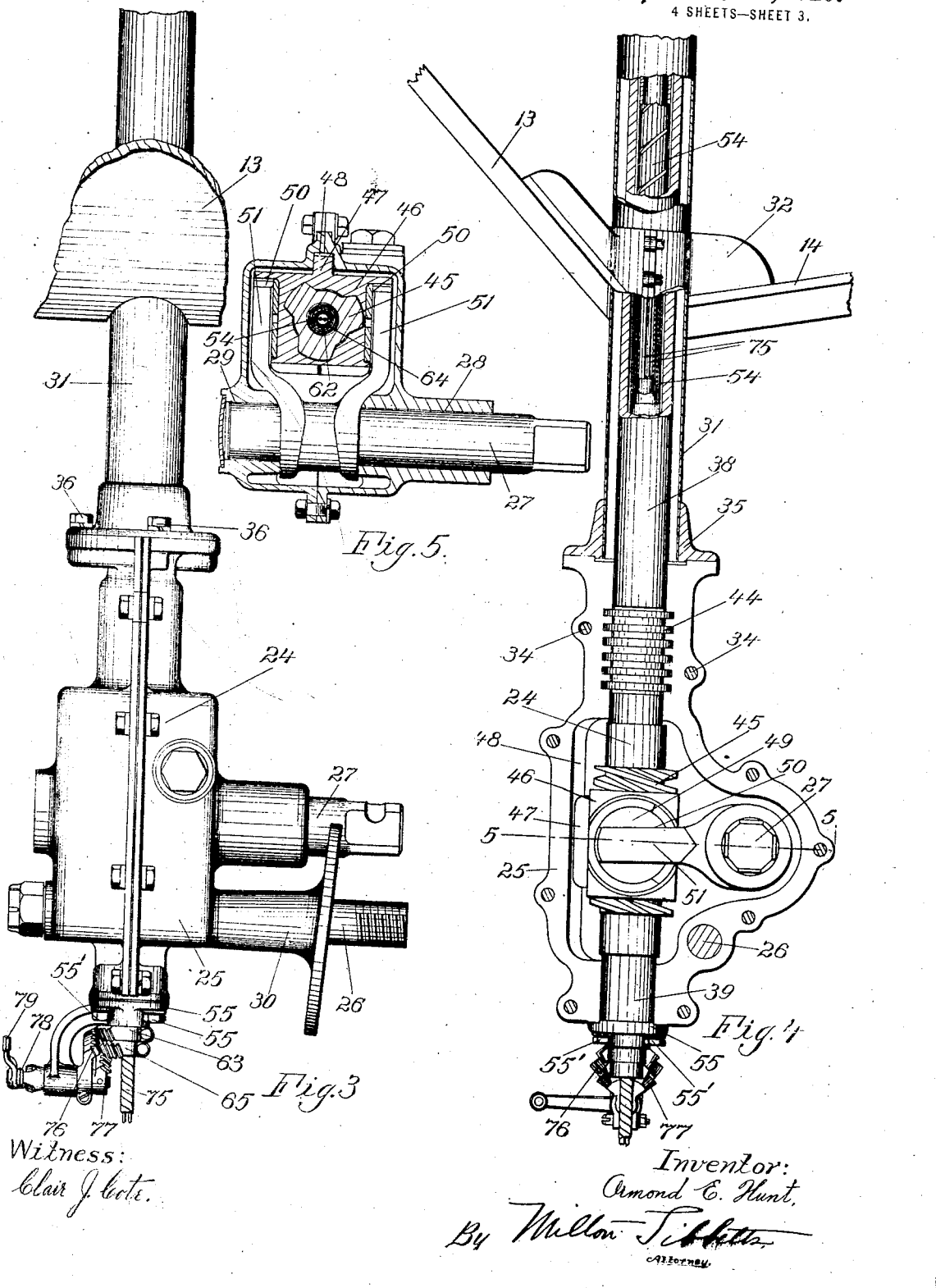

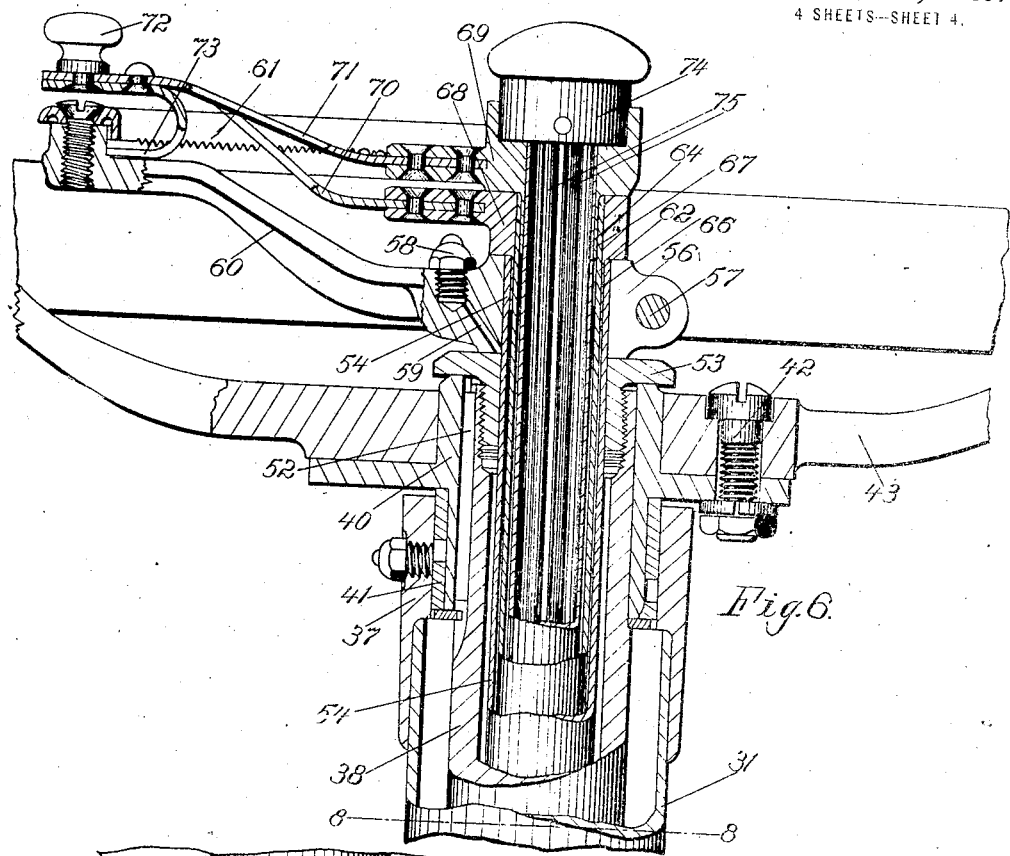

ORMOND E. HUNT, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,348,997.    Specification of Letters Patent.    Patented Aug. 10, 1920.

Application filed December 30, 1915. Serial No. 69,394.

*To all whom it may concern:*

Be it known that I, ORMUND E. HUNT, a citizen of the United States, and resident of Detroit, Wayne county, State of Michigan, have invented certain new and useful Improvements in Motor-Vehicles, of which the following is a specification.

This invention relates to motor vehicles and particularly to the steering mechanism and the control of the motor.

One of the objects of the invention is to so mount the steering mechanism proper upon the frame of the vehicle that it may be readily adjusted to various angles.

Another object of the invention is to provide a simple and efficient control mechanism for the motor throttle, in connection with the steering mechanism of the vehicle.

Another object of the invention is to provide a steering shaft with an inclosing casing and a stationary tube within the steering shaft for supporting and housing the motor control devices.

Another object of the invention is to provide a simple and efficient worm and nut steering mechanism with a suitable casing therefor.

Other objects of the invention will appear from the following description taken in connection with the drawings which form a part of this specification, and in which Figure 1 is a side elevation of the forward part of a motor vehicle embodying this invention, parts being broken away;

Fig. 2 is an enlarged view of the steering column and adjacent parts to the vehicle, together with the connections for controlling the motor throttle;

Fig. 3 is a front elevation of a steering mechanism arranged for clearness in vertical position instead of diagonally;

Fig. 4 is a vertical longitudinal sectional view through the steering mechanism shown in Fig. 3;

Fig. 5 is a transverse section substantially on the line 5—5 of Fig. 4;

Fig. 6 is an enlarged longitudinal sectional view of the upper portion of the steering column;

Fig. 7 is a view similar to Fig. 6, of the lower part of the steering column, and Fig. 8 is a transverse section substantially on the line 8—8 of Fig. 6.

Referring to the drawings, 10 represents the forward part of the motor vehicle frame upon which is mounted a motor 11, a radiator 12, a dash board 13, and a floor board 14. The frame is supported through springs 15 upon an axle 16, having steering spindles 17 upon which the wheels 18 are rotatably mounted. Arms 19 on each of the steering spindles 17 are connected by a cross link 20, and there is another arm 21 on one of the steering spindles by which both of the spindles are steered through the means of a link 22 of the usual form. This link 22 extends rearwardly substantially parallel with the frame 10 and is adapted to be operated by an arm 23 of steering mechanism 24. This steering mechanism is in the form of a casing or housing 25 which is pivotally mounted upon the frame 10 as by bolt or trunnion 26. The arm 23 is rigidly keyed to a rock shaft 27 which extends through a suitable opening in the side of the frame 10 and into the casing 25 where it has suitable bearings as at 28 and 29, as shown particularly in Fig. 5. In Figs. 3 and 4 may be seen the bolt 26, and in Fig. 3 there is a flanged boss 30 which may be arranged between the casing 25 and the side of the frame 10 to act as a spacer or positioning member.

In Fig. 1 it will be seen that the casing 25 extends diagonally upwardly and rearwardly in the form of a tube 31 through a bracket 32 which may be secured to the dash 13 and floor board 14. As shown in full lines in said Fig. 1 the steering column is positioned for a certain type of vehicle, whereas in dotted lines the steering column is set lower for a vehicle in which the seats are lower or farther to the rear. It will be understood that this adjustment is made by loosening the nuts securing the bolt 26. As the steering column is lowered the rock shaft 27 will, of course, move about the axis of the bolt 26, the opening through the frame 10 being in the form of a slot 33 as shown in dotted lines in said Fig. 1.

By thus arranging the axis of the rock shaft 27 eccentric to or rearwardly of the axis of the bolt 26, when the adjustment of the steering column is made as above referred to, the rock shaft 27 merely moves downwardly somewhat, carrying with it of course the arm 23, and the angle of said arm is altered only slightly. Thus the relative position of the arm 23 to the axle 1

16 and its spindles is substantially maintained during this adjustment.

Upon reference particularly to Figs. 3, 4 and 5, the casing 25 is seen to be formed in two parts, detachably secured together as by the bolts 34. The tubular part 31 of the casing has a flange 35 brazed or otherwise secured to its lower end and this flange is bolted to the lower part of the casing as by bolts 36. Upon the upper end of the tubular part 31 of the casing is secured a collar 37. Mounted within and extending longitudinally of the entire casing is a tubular steering shaft 38. The extreme lower end 39 of this shaft 38 has a bearing in the lower part of the casing 25, and the upper end of the shaft has a bearing in the collar 37 at the upper end of the tubular part 31 of the casing. This latter bearing is through a flanged piece 40 which is keyed to the upper end of the shaft 38 and which is mounted directly in a bushing 41. Secured to the flange piece 40 as by bolts 42 is the steering wheel 43 of the steering mechanism.

Intermediate the end of the shaft 38 there is a large thrust bearing 44 in the casing 25 for the purpose of taking all end thrust of the shaft 38.

Between the thrust bearing 44 and the lower end 39 of the shaft 38, the latter is formed with a worm 45 upon which is a nut 46 guided directly in the casing 20 as by the lug 47 and guideway 48.

In each side of the nut 46 is mounted a trunnion piece 49 having a transverse groove or slot 50. Arms 51 which are shown as formed integral with the rock shaft 27 extend into and operate in these slots 50 as the nut 46 is moved longitudinally of the shaft 38 by the rotation of the latter. Thus through the arms 51 the shaft 27 is rocked upon its axis carrying with it the arm 23 which thereby moves the spindles 17 through the link 22 above referred to.

Referring particularly to Fig. 6, it is seen that the flange piece 40 is keyed to the shaft 38 by a key 52 and is retained thereon by a member 53 threaded into the end of said shaft. It will be noticed also that the head of the member 53 overlaps the upper end of the member 40 and forms a second securing means for retaining the steering wheel 43 on the flange member 40.

For the purpose of housing and supporting the motor control devices within the steering shaft 38, a tube 54 extends entirely through said shaft 38 and is connected to the lower part of the casing 25 through a flange piece 55 to which it is brazed. The flange piece 55 is removably secured as by bolts 55′. The upper end of the tube 54 has a bearing in the threaded member 53 so that the latter may turn on it with the shaft 38, and a bracket 56 is detachably secured to the extreme upper end of the tube 54 immediately above said threaded piece 53. The securing means is in the form of a clamping bolt 57, the bracket being a split sleeve where it surrounds the tube 54. Oil may be supplied to the bearing between the tube 54 and the member 53 as through the oiler 58 and the channel 59. An arm 60 extends radially from the bracket 56 and supports a segment 61 for a purpose hereinafter described.

As shown in Fig. 7 it will be seen that the extreme lower end of the tube 54 where it is brazed into the flange piece 55 is slightly contracted and thereby forms a bearing for the lower part of a hollow rod or tube 62 which may be termed a control rod or tube. Said tube 62 extends slightly below the end of the tube 54 and is itself slightly contracted at that point and surrounded by and keyed to a segment or gear 63. Concentrically arranged within the control tube 62 is a second control tube 64, the lower part of which has a bearing in the contracted part of the control tube 62. Said control tube 64 also has a segment or gear 65 keyed or otherwise secured to it.

Between the upper end of the tube 54 and the control tube 62 is a bushing 66, and between the upper end of the control tube 62 and the control tube 64 is a bushing 67. Thus it will be seen that the various tubes are in contact with each other only at the upper and lower ends whereby there is little likelihood of the tubes sticking or rattling.

Upon the extreme upper end of the control tube 62 is secured a boss 68, and upon the extreme upper end of the control tube 64 is a similar boss 69. These bosses are provided with radial arms 70 and 71 which have operating handles 72 and spring fingers 73 adapted to coöperate with the segment 61, above referred to, to lock the arms in any desired position.

Mounted upon the boss 69 of the control tube 64 is a switch 74 of any suitable form, adapted to connect as desired the two wires 75 which extend downwardly through the inner control tube 64. It will be understood that this control tube 64 is entirely open at its lower end and the wires 75 project therethrough and may be connected with any suitable electrical device such as a horn.

Upon reference particularly to Figs. 3, 4 and 7, it will be seen that the segments 63 and 65 mesh respectively with segments 76 and 77 connected respectively to arms 78 and 79 which are adapted to operate the motor throttle and ignition mechanism. In Fig. 2 the arm 78 is shown as connected to the rod 80 which has a lost motion or pin and slot connection 81 with an arm 82 of a lever 83 pivoted at 84. As shown the lever 83 is pivotally supported upon a lug 85 on the dash board 13 adjacent the steering column. An arm 86 of the lever 83 is connected through a link 87 and arm 88 with the motor throttle 89.

The lever 83 has a third arm 90 which is connected by a link 91 with a pedal lever 92 for operating it. The lever 92 is shown as pivotally supported at 93 upon the floor board 14, and a retracting spring 94 is adapted to maintain the various connections including the throttle valve 89, in normal position.

It will be seen that the valve 89 may be opened by the pedal lever 92 against the action of the spring 94, regardless of the position of the rod 80, since the pin and slot connection 81 permits the arm 82 to operate without moving said rod 80. However, upon pressure being removed from the pedal lever 92, the spring 94 retracts the connections to the position determined by the rod 80. The position of the rod 80 is in turn determined by the arm 70 at the top of the steering column.

A specific embodiment of the invention has been described in detail and will be specifically claimed, but it will be understood that the invention is not limited to the exact details of the construction shown, as it will be apparent that changes may be made without departing from the spirit or scope of the invention.

Having thus described my invention, what I claim and desire to secure by Letters Patent is:

1. In a steering mechanism for motor vehicles, in combination, a stationary supporting casing having an upwardly extending tubular part, a tubular steering shaft having bearings in the upper and lower parts of said casing, a tube connected to the casing at its lower end beyond the end of said shaft, a steering wheel keyed to the upper end of said shaft, a threaded member adapted to hold said wheel in place and forming a bearing between the upper end of said shaft and said tube, and motor control devices mounted in said tube.

2. In a steering mechanism for motor vehicles, in combination, a stationary supporting casing having an upwardly extending tubular part, a tubular steering shaft having bearings in the upper and lower parts of said casing, a tube connected to the casing at its lower end beyond the end of said shaft, a steering wheel keyed to the upper end of said shaft, a threaded member adapted to hold said wheel in place and forming a bearing between the upper end of said shaft and said tube, a bracket mounted on said tube immediately above said member, motor control devices mounted in said tube, and arms coöperating with said bracket and connected to operate said devices.

3. In a steering mechanism for motor vehicles in combination, a stationary supporting casing having an upwardly extending tubular part, a tubular steering shaft mounted to turn in upper and lower bearings in said casing, a flanged member connected to the upper end of said shaft, a steering wheel keyed to said flanged member, a bearing member secured to said shaft and having means for retaining said steering wheel on said flanged member and a tube extending through said bearing member and shaft and adapted to house the motor control mechanism.

In testimony whereof I affix my signature.

ORMOND E. HUNT.